United States Patent
Li et al.

[11] Patent Number: 5,768,894
[45] Date of Patent: *Jun. 23, 1998

[54] APPARATUS, PROCESS AND SYSTEM FOR TUBE AND WHIP ROD HEAT EXCHANGER

[75] Inventors: Yao Tzu Li, Lincoln, Mass.; Albert Yundt, Jr., Nashua, N.H.; I-Chien Ho, Concord; Hong Ding Huang, Framingham, both of Mass.

[73] Assignee: Y.T. Li Engineering, Inc., Acton, Mass.

[*] Notice: The term of this patent shall not extend beyond the expiration date of Pat. Nos. 5,363,660 and 5,385,645.

[21] Appl. No.: 571,906

[22] PCT Filed: Jun. 22, 1994

[86] PCT No.: PCT/US94/44503

§ 371 Date: Dec. 19, 1995

§ 102(e) Date: Dec. 19, 1995

[87] PCT Pub. No.: WO95/00808

PCT Pub. Date: Jan. 5, 1995

Related U.S. Application Data

[63] Continuation-in-part of Ser. No. 81,039, Jun. 22, 1993, Pat. No. 5,385,645, and Ser. No. 81,499, Jun. 22, 1993, Pat. No. 5,363,660, each is a continuation-in-part of Ser. No.718,083, Jun. 17, 1991, Pat. No. 5,221,439.

[51] Int. Cl.[6] .............................. F25C 5/12; F28F 13/12
[52] U.S. Cl. ................... 62/71; 165/109.1; 165/DIG. 84; 165/DIG. 325
[58] Field of Search .................................. 165/109.1, 94, 165/DIG. 76, DIG. 81, DIG. 84, DIG. 85, DIG. 87, DIG. 135, DIG. 138, DIG. 139, DIG. 152, DIG. 154, DIG. 155, DIG. 318, DIG. 320, DIG. 325, DIG. 326; 62/71, 354, 345

[56] References Cited

U.S. PATENT DOCUMENTS

| | | | |
|---|---|---|---|
| 3,049,895 | 8/1962 | Larson et al. | 62/354 |
| 3,190,817 | 6/1965 | Neugebauer et al. | 202/236 |
| 3,250,687 | 5/1966 | Frank | 159/DIG. 7 |

(List continued on next page.)

OTHER PUBLICATIONS

Electric Power Research Institute Journal, Cool Storage: Saving Money and Energy, Jul./Aug. 1992, pp. 14–21.

Product Brochure of Turbo Refrigerating Company, Thermal Energy Storage, HP Series/IGC Series, pp. 1–12.

(List continued on next page.)

*Primary Examiner*—William Doerrler
*Attorney, Agent, or Firm*—Peter J. Manus, Esq.

[57] ABSTRACT

An apparatus, thermal storage system and method for heat exchange using a tube-type heat exchanger. A rod (24) or rods (24, 24') are propelled to move over the inner surface (7) of the tube (1). The moving rod (24) is in contact with a first process liquid which is adjacent the inner surface (7) as a falling film or by flooding the interior of the tube (1). The flooded mode is particularly useful where the tube (24) is non-vertical or the heat exchanger is used to make an ice slurry for HVAC systems serving high-rise buildings. Multiple such rod (24) and tube (1) assemblies are operated simultaneously using a drive plate (22) powered to execute an orbital motion in a plane generally orthogonal to the rods (24, 24'). In one form the plate (22) is coupled via a crank (40) to equiangularly spaced rods (24, 24') in each tube (1). The rods (24, 24') are preferably mounted to be movable radially, for example suspended through holes (23) in, and driven by, a plate (22) to execute an orbital motion or at recesses (49, 49') in the rod (24) in radially directed slots (48, 48') in an arm (46) rotated by a tube-mounted crank (40).

13 Claims, 7 Drawing Sheets

U.S. PATENT DOCUMENTS

| | | | |
|---|---|---|---|
| 3,271,272 | 9/1966 | Watt | 202/236 |
| 3,328,972 | 7/1967 | Svanoe | 62/123 |
| 3,498,081 | 3/1970 | Benesh | 62/354 X |
| 4,230,529 | 10/1980 | Li | 202/175 |
| 4,441,963 | 4/1984 | Li | 202/172 |
| 4,468,930 | 9/1984 | Johnson | 62/71 |
| 4,504,361 | 3/1985 | Tkac et al. | 202/236 |
| 4,551,159 | 11/1985 | Goldstein | 62/541 |
| 4,618,399 | 10/1986 | Li | 159/6.2 |
| 4,762,592 | 8/1988 | Li | 202/172 |
| 4,781,245 | 11/1988 | Freychet et al. | 165/94 |
| 4,796,441 | 1/1989 | Goldstein | 62/354 |
| 4,907,415 | 3/1990 | Stewart, Jr. et al. | 62/66 |
| 5,165,469 | 11/1992 | Smith | 62/354 |
| 5,363,660 | 11/1994 | Li et al. | 62/71 |
| 5,385,645 | 1/1995 | Li | 202/175 |

OTHER PUBLICATIONS

Product Brochure of Carrier, "Encapsulated Ice Storage," pp. 1–15.

Product Brochure of ABCO Industries, Ltd., Fluidice.

Holusha, J., New York Times, "Keeping Buildings Cool With Greater Efficiency," Sep. 27, 1992.

Huang, Hongding, Article entitled, "Swirl–flow Internal Thermosyphon Boiling Device—Part II, Calculation of Fluid Flow and Heat Transfer", pp. 671–677.

Liu Guowei et al., "Heat Transfer Enhancement in A Two–Phase Closed Thermosyphon", pp. 27–31, and Abstract (in English).

Product Brochure of Calmac Manufacturing Corporation, An Introduction to Off–Peak Air Conditioning OPAC for Commercial Application, pp. 1–8.

APPARATUS, PROCESS AND SYSTEM FOR TUBE AND WHIP ROD HEAT EXCHANGER

REFERENCE TO RELATED APPLICATIONS

This application is a continuation-in-part of U.S. patent application Ser. No. 08/081,039 filed Jun. 22, 1993, now U.S. Pat. No. 5,385,645 and U.S. patent application Ser. No. 08/081,499 filed Jun. 22, 1993, now U.S. Pat. No. 5,363,660, both of which, in turn, are continuation-in-part application of U.S. patent application Ser. No. 718,083 filed Jun. 17, 1991, now U.S. Pat. No. 5,221,439.

BACKGROUND OF THE INVENTION

This invention relates in general to heat transfer apparatus and methods for evaporating, distilling, freezing, heating or cooling liquids, and more specifically, to an orbital drive for a whip rod used in conjunction with a tube and surrounding shell type of heat exchanger.

When processing fluids, it is often required to transfer heat to or from the liquid using a heat exchange surface, typically one formed of sheet metal, and a second process fluid on the opposite side of the sheet metal that is at a different temperature than the liquid being processed. This heat transfer between fluids may serve to warm the process fluid or cool it, as in a glycol chiller commonly used in building air conditioning systems. It may also serve to change the phase of the fluid, as in the production of fresh water by boiling it from sea water, or the production of ice slurries by partially freezing water or a water solution. Ice slurries are useful, among other applications, for cold storage to reduce peak load power demands in building air conditioning systems and to provide refrigeration for food such as milk stored on a dairy farm for transport to a processing plant and fish catches stored on fishing vessels.

The size, and hence cost, of a heat exchanger depends on the heat transfer coefficient, which reflects resistance to heat flow through a layer of a "hot" fluid, a heat exchanger wall separating the hot and cold fluids, a layer of a "cold" fluid, plus deposits forming on either hot or cold surfaces of the wall. For economic reasons, a substantial temperature gradient is required to drive the heat transfer through these resistances. This high gradient limits the energy efficiency of evaporators or freezers by either limiting the number of stages or imposing a higher lift on a vapor compressor U.S. Pat. Nos. 4,230,529 and 4,441,963 issued to one of the present applicants disclose a new approach to solving these problems. They involve using a vertical, thin-walled, open-ended heat transfer tube (or tubes) driven in an orbital or wobbling motion. This orbital tube motion increases the heat transfer efficiency by reducing the thermal resistance at the inner and outer surfaces of the tube. The motion swirls a liquid to be evaporated into a generally thin film over the inner surface of the tube. This increases the evaporation surface area and decreases the thermal resistance by decreasing the thickness of the liquid layer. The orbital motion also aids in heat transfer into the tube at its outer surface produced by condensation of a heated vapor stream. The condensation increases the thickness of the liquid layer at the outer surface, and hence its thermal resistance. The orbital motion throws off the droplets, thereby increasing the heat transfer at the outer wall.

Both of these patents teach multiple such tubes held in a common container. Eccentrics drive the tubes to undergo a wobbling motion in a horizontal plane. The liquid is driven in turn by a dynamic coupling to revolve over the inner surface as it flows down the tube under the influence of gravity. These arrangements require cranks, bearings and complicated seals inside the evaporator that accommodate this movement. The component parts are difficult and costly to manufacture and assemble, they must be machined to close tolerances, they are susceptible to corrosion and contamination when used in the chemical industry, and they wear, which leads to a deterioration in the balance of the wobbling tubes and attendant vibrations. The '529 patent also discloses a self balancing arrangement with a self adjusting orbital radius that accommodates the balance to changes in mass. However, if the base moves, e.g., if the apparatus is mounted on a moving reference frame such as a ship at sea, the crank radius must be fixed, and even this step may not be adequate.

Many known heat transfer devices ranging from ice cream makers to sophisticated evaporators use a rigid wiper bar that is positively driven to rotate within the tube to spread viscous liquids into a thin, evenly distributed film. Positively driven wipers can handle fluids with a viscosity of 1,000,000 c.p. or higher. (Water has a viscosity of 1 c.p.) However, known heat transfer devices using rigid, positively driven wiper or scraper have drawbacks. First there is a need to introduce into the evaporator or freezer, and to seal, a rotational drive shaft. Second, because the wiper or scraper is rigid and moving over a fixed surface at close spacings, manufacturing and assembly become difficult and costly. The surface must be machined to close tolerances, as well as the wiper/scraper and its support structures. Further, these known rigid wiper arrangements are susceptible to, and comparatively intolerant of, wear.

To solve these problems for less viscous fluids, e.g. those with a viscosity of 1 to 1,000 c.p., U.S. Pat. No. 4,618,399 describes a whip rod located in the tube which spreads the feed liquid into a highly thin and uniform film to reduce its thermal resistance and to enhance its evaporation. The whip rod also controls the build up of solid residue of evaporation. The '399 patent discloses several arrangements for mounting the rod, including lengths of cables, a flexible, but non-rotating anchor connected between a base and the lower end of the rod, and a double universal joint also connected between the lower end of the whip rod and the base. While the whip rod is effective as a film distributor, the mounting arrangements have disadvantages. They increase the overall material, assembly and operating costs. Also, they fail. Material fatigue of flexible cables supporting the whip rods is a particular concern.

U.S. Pat. No. 4,762,592 describes an orbital drive that overcomes the manufacture, assembly, wear and balance problems of the earlier eccentric-crank drives. This improved drive uses a rotating counterweight or weights mounted on the evaporator and a spring-loaded strut suspension for the evaporator. The counterweights and the mass of the evaporator revolve around one another as the counterweights rotate.

While this arrangement does overcome the problems associated with an eccentric crank drive, it also suffers from certain deficiencies. For example, it requires the orbital movement of a large mass, particularly where the unit is scaled up to a commercial size with multiple large tubes, each carrying a liquid stream. This mass increases the power requirements (particularly on start up), increases the demands on the spring-strut suspension, can lead to an early fatigue failure of the suspension, and generally increases the construction and operation cost of the system. It also increases the desirability of a stable operating platform, e.g. a concrete floor, as opposed to one that moves such as a ship at sea or some other transport. While the '592 patent proposes a solution to the moving platform problem, the solution in practice has not been adequate when the apparatus has been scaled up to commercially useful sizes. One problem was that when the unit was scaled to a commercially acceptable size, motion of the base placed unacceptably high loads on a crank or cranks that drove the entire unit into an orbital motion.

While the orbital tube approach has been used for evaporation and distillation, in the prior art it has not been applied for freezing. One reason is that the liquid freezes to the heat transfer surface, increases the resistance to a heat flow through the exchanger, and thereby greatly reduces any performance advantages of the orbital tube approach.

Currently, there are two principal types of cold storage systems on the market using ice. One is known as the ice harvester type, where a group of ice making machines are installed over an open storage tank. Ice grows to a certain thickness before being periodically harvested into the tank by a defrosting cycle. The other one is known as the ice bank type. It employs a group of low cost heat transfer units, usually made of plastic, on which all the ice needed for cold storage accumulates continuously during each chilling cycle. In either of these two types, the effectiveness of transferring the heat from the water to the refrigerant during the ice forming process is not as efficient as desired, thus increasing equipment cost.

The concept of making ice in slurry form so that the ice making machine can operate continuously, without interruption, and with some improved heat transfer property has been attempted in the industry by companies such as the Chicago Bridge and Iron, Inc. and more recently, by the Electric Power Research Institute ("EPRI") with their scheme publicized under the rade designation "Slippery Ice". At the present time the performance of the Slippery Ice cold storage system is believed to be in the evaluation stage.

The EPRI sponsored research to develop a "Slippery Ice" system was reported in an article entitled "Cool Storage: Saving Money and Energy" published in the July/August 1992 issue of the EPRI Journal. In the EPRI scheme, calcium magnesium acetate is added to the water. According to EPRI, the use of this additive causes ice to form in the liquid pool, away from the heat exchanger surface, and results in a slushy type of substance that does not cling to metal. The advantages of the "Slippery Ice" for improving the economy were also reported in Sep. 27, 1992 edition of The New York Times entitled "Keeping Buildings Cool With Greater Efficiency". In this article the use of automobile antifreeze in the water to be frozen was reported to be unsatisfactory because it tends to lower the freezing point too much.

The Slippery-Ice concept is attractive because it causes an ice slurry to flow down a chilling surface under the influence of gravity only, without mechanical aid. While Slippery Ice works, how it works is not known. Moreover, this approach has several significant drawbacks. First, only one known additive lets ice overcome the initial stickiness barrier to a gravity feed of crystals down the chilling surface. This is of particular concern where the liquid being processed is a food product; this additive cannot be used. Another limitation is that the heat flux, wetting rate and additive concentration must be carefully controlled for the Slippery Ice to form. Also, the heat transfer surface must be electropolished.

In many circumstances, it is undesirable to require that the liquid pass through the heat exchanger in a falling film. If the heat exchanger tubes were flooded, then the liquid supply pressure would be sufficient to transfer it to the next processing step. The complication and expense of an additional pump and level control system, which are usually required in systems using a falling film heat exchanger, would not be necessary. Heretofore orbital heat exchangers have been limited to operation with a falling film. One reason is that because the entire apparatus orbits, or the tubes within the outer shell orbit, flooding the tubes greatly increases the mass being orbited. This in turn increases the power required for operation, increases wear, and increases vibration/balance problems. In addition, movement of whip rods within flooded tubes is, in general, impeded by the liquid, or moves in coordination with the revolving body of liquid in the tube so that the rod has a diminished effect on the heat transfer process.

In certain applications it may be desirable to orient the heat exchanger tubes other than vertically. For example, on a ship, the pitch and roll of the ship with the waves would require expensive gimbal arrangements to operate with the tubes in a vertical orientation. Even in land-based systems, non-vertical orientations may be desirable to accommodate restrictions on equipment height, to fit through doors or under existing ceilings, and to ship units in standard shipping containers.

It is also desirable to reduce the vibration produced by unbalanced rotating or revolving masses (e.g. whip rods and drive members). The vibration is easily seen by the user and raises concerns about equipment durability and possible fatigue failure of pipe connections to the heat exchanger. It also increases the power consumed and places an increased stress on the mounting arrangement. Heretofore, one solution has been to orbit tubes in groups with a 180° phase difference between the groups. The '529 and '963 patents illustrate this approach. The '592 patent discloses orbiting counterweights.

Recent development work suggests that as the orbital heat exchange units are scaled up to more commercially useful sizes and operated under conditions that maximize the heat transfer flux, a new set of design problems come to the forefront. Using orbital technology, a straightforward way to scale up at the desired surface-to-volume ratio is to use more tubes. For example, a twenty ton freezer/chiller can have forty-two 1½ inch diameter tubes. A thirty ton evaporator of the vapor compression type for sea water desalinization can have two hundred fifty-eight tubes. With this many tubes, significant problems occur in delivering the required torque to all the tubes with the correct phase relationship, providing manageable wear, keeping vibration low, part count low, and providing assembly ease become roadblocks to commercially-sized multi-tube apparatus.

Known orbital drives and conventional wiper arrangements do not meet demands of such multiple tube set-ups. The masses of the tubes, or containers and tubes, place extreme strains on rotary bearings of eccentrics coupled between a rotary power source and the end application of the force. Large forces quickly produce wear in bearings and at drive surfaces causing play in the drive train and a loss of the desired phase relationships between the movement of groups of tubes. Large forces also increase the friction in the drive train. To crank rods at each of many tubes using an array of gears or pulleys, even without considering wear, presents a daunting mechanical design problem, particularly if this mechanical array is exposed to, or must be compatible with a feed fluid. The wear problems, even in known wiper systems such as the freezer/chiller sold by Sunwell using rotating wiper blades acting on a heat exchange surface requires initial precise tolerancing and thereafter recommended annual re-conditioning of the blade assembly at a cost in excess of many thousands of dollars per re-conditioning. In practice, wear not only affects performance, but also can have a dramatic impact on the ongoing cost of operation.

A special concern in ice-slurry applications is that at a high cooling rate, ice forming on the heat transfer tube can not only reduce heat transfer efficiency, but it can also grow to fill the tube with ice and eventually freeze the whip rod in the center of the tube. Also, there is typically more ice near the bottom of the tube than the top. It is therefore desirable to reduce the number and size of mechanical obstructions to the exit of the ice slurry from the bottom of the tubes. This suggests a top mounting of the rods for this application. A whip rod orbiting within the tube, however, may nevertheless experience a variation in the mechanical resistance to its movement due to variations in the amount of ice present in the tube as a function of its length. This is more likely to occur as the exchanger is operated at a high heat flux. As a result, the whip rod may not "center", that is, align itself with the vertical axis of the tube, but rather it may assume a skewed, or cocked orientation characterized by its lower end trailing its upper end. Any such skewing is highly undesirable since it interferes with the beneficial action of the rod when it is fully engaged with the tube.

In addition, while various arrangements have been tried to lower the flux resistance at the outside of the tube due to condensation, these techniques are not useful where evaporation or boiling occurs at the outside surface. Clearly the energy efficiency of freezing and chilling applications can be enhanced by decreasing thermal resistance at the outer tube surface. No known apparatus or techniques accomplish this end.

It is therefore a principal object of this invention to provide an orbital heat exchanger, a thermal storage system using that exchanger, and a process of heat exchange that can operate either in a flooded or falling film mode, and either in a vertical or non-vertical orientation, or on a fixed or moving base.

Another principal object is to provide an orbital drive for a rod-in-tube type orbital heat exchanger that can be readily scaled up to drive multiple tubes with positive tangential and radial components of the drive force on the rod to deal with high viscosity liquids and solid deposits on the tube wall.

Still another principal object is to provide an apparatus and method for enhancing the heat transfer at the outside of a tube used for freezing or chilling.

A further object is to provide an orbital heat exchanger with an orbital drive that has a comparatively low mass and a comparatively low power consumption.

Another principal object is to provide an orbital drive for a rod-in-tube type heat exchanger where the rod is self-adjusting to maintain a parallel alignment with respect to the tube.

A further object is to provide an orbital drive with the foregoing advantages while being substantially insensitive to wear of drive parts and having no critical tolerances.

A further object of the invention is to provide a heat exchanger and orbital drive which can operate as a freezer/chiller at a high heat flux of the exchanger.

Still another object of the invention is to reduce the amount of vibration produced by an orbital heat exchanger.

Yet another object is to provide an orbital heat exchanger with the foregoing advantages which has a favorable cost of manufacture both in terms of a low part count, in terms of ease of assembly for a low manufacturing cost and easy disassembly for low cost maintenance.

SUMMARY OF THE INVENTION

A heat exchanger feeds a first process fluid into one end of at least one thin-walled, open-ended heat transfer tube. An outer housing or shell surrounds the tube or tubes to define a chamber which at least in part causes a second process fluid to come in contact with the outer surface of the tube or tubes. There is a temperature difference between the first and second fluids, one being "hot" and the other being "cold". The inside of the heat exchanger tube may either be flooded or coated with a falling film of the first process liquid. If the tube contains a falling film, then the heat exchanger is oriented so the liquid generally falls from a feed point at the top towards the bottom under the influence of gravity. However, the tube need not be perfectly vertical. There are no restrictions on the orientation of a flooded tube during its operation.

In evaporation, distillation, or heating applications, a hot second process fluid (such as steam) flows over the outer surface of the tube. The resulting inward radial heat flow through the heat transfer tube causes the first process liquid on the inside to evaporate (in evaporation or distillation) or to heat (in heating). In liquid cooling, the second process fluid is a cold fluid (such as boiling refrigerant) that flows over the outer surface of the tube. The resulting outward radial heat flow through the heat transfer tube causes liquid on the inside to fall in temperature. In liquid freezing, the outward radial heat flow through the heat transfer tube is sufficient to cause the first process liquid on the inside to partially freeze.

At least one whip rod is located inside and moved about each tube over its inner surface. In one form, suitable for a falling film mode of operation with a low viscosity fluid, the rod is formed of a material, and is configured and mounted so that it flexes to conform to the inner surface when moved around the inner surface. The rod can be of a circular cross-section and it may be inserted to roll as it moves over the inner tube surface. The rod can also assume non-circular configuration and not roll. The edges of rods with rectilinear and other angled cross-sections can act as chisels to remove solid deposits on the inner surface.

A direct, positive orbital drive propels the whip rod or rods to move about the tube with the rod generally aligned with the tube axis. The tubes are stationary. In a falling film mode, the whip rods distribute the liquid over the inner surface. In freezing applications, it is also important that the rod creates turbulence in the liquid stream being pushed by the rod as it orbits the tube. The low mass of the rods, compared to the much larger mass of the tubes, process fluid and associated tube support structures, reduces the power consumption, reduces the load on the drive train and allows operation in a flooded or non-vertical condition, including reliable operation on a moving reference frame such as a vessel at sea. If the insides of the heat exchanger tubes are flooded, then the whip rod is preferably driven from both ends. If the tubes are not flooded, the whip rod is preferably suspended from a drive plate mounted over the tubes and the rods.

A drive plate (or plates) extends in a plane generally orthogonal to the rod or rods. It moves the whip rods, or groups of the rods, in unison. In one form of the orbital drive, at least one eccentric crank powered by a motor moves the drive plate in an orbital motion within that plane. Particularly in freezer applications there is one drive plate located over the rods from which the rods are suspended.

For large scale operation with multiple tubes, or where there is a need for a high torque applied to the rods, the positive-rod drive is preferably of a drive plate-crank type. A rotary motive power source acting through an eccentric, or an equivalent such as synchronized linear drives arrayed with 90° angular separation, propels a drive plate to execute an orbital motion in a plane generally orthogonal to the rods. A crank is mounted in or adjacent to one end of each tube. The mount is a spider-like frame that slides into a recess in the tube end. A drive pin mounted on an arm is engaged in an associated opening or bearing in the plate. The crank has a central bearing supported by the frame which rotatably mounts a shaft that extends into the tube. The orbital motion of the plate is transferred simultaneously to all of the tubes via the associated cranks. Finally, the rod is mounted to the shaft. In one form, plural rods are arranged equiangularly around the shaft for a good dynamic balance. The mounting includes an arrangement such as a radially directed slot in the end of a rotary arm that captures a rod, suspends it, and allows it to move radially in response to the applied centrifugal force, wear, and changes in operating conditions. This form of orbital drive transforms an orbital motion into multiple rotary motions of multiple rods in an array of tubes. The plate holes are preferably oversized to act as a feed liquid openings for the associated tubes and thereby to lubricate the pin-to-plate coupling. This power train produces a large tangential torque at each tube that propels the rods through solid deposits growing from the tube walls and through the process liquid in the tube, whether in a falling film or a flooded form, whether the liquid is watery or viscous.

Auxiliary radial force generating arrangements can augment the centrifugal force on the rods produced by the rotation and allow the rods to change their radial position—a non-rigid mount. In the preferred form, these auxiliary radial force devices are spring mounts for the rods secured to the central shaft to urge the rods outwardly. Pairs of leaf springs secured to an upper and lower end of each rod are preferred. The level of the auxiliary force generated is sufficient to resist an inward growth of solid deposits, e.g., ice in freezing applications, and to resist skewing of the rod as it rotates due to low rotational speeds or to variations in the resistance to its movement over the tube, e.g. the presence of more ice near the bottom of a vertically oriented tube than the top. In freezer applications, stops, preferably in the form of metallic wire clips, are secured between the shaft and rods to limit the maximum outward travel of the rods and thereby to set a small gap between the rods and the inner tube surface. This gap reduces rod wear and sliding friction. If an ice coating forms, the rods limit its inward growth to the dimensions of this gap. Turbulence caused by the moving rods, and to some extent by the springs and clips, minimize the attachment of ice crystals to the tube wall. In the preferred form for freezing, the process fluid has an additive which, as presently understood, depresses the freezing point below that of the pure process fluid to promote the formation of crystals in the fluid, not at the wall. For water, suitable additives are ethylene glycol, propylene glycol, milk sea water, calcium magnesium acetate, and inorganic salts that form anhydrous crystals. A 3% to 10% solution is typical.

In contrast to a large system where high surface/volume ratio is preferred and high flux density would further reduce the surface area, an alternative set of conditions prevail in a small system where simplicity and part count often take precedence over the economy derived on per unit area or per unit volume basis. For instance the simplicity of several free wheeling whip rods set to revolve in one relatively large cylinder could be more economical than several small tubes each with one rod and drive to orbit by the orbital drive.

Using cranks to drive the whip rods can also set the rods at various phase angles with respect to the crank. If using a single rod in each tube is preferred, dynamic balancing can also be achieved by grouping the rods in opposing phase angles in the same logic as the balancing concept described '963.

To enhance heat transfer at the outer tube surface for freezing and chilling applications, a tubular jacket open at its top and bottom to a flow of the second process fluid, surrounds the heat exchange tube to define an annular thermosyphon. The second process fluid is a boiling refrigerant that becomes a two phase flow along the outer tube surface during operation. The jacket creates a convection flow where a less dense mixture of boiled vapor and liquid forms a high speed upward flow along the outer surface.

These and other features and objects will be more fully understood from the following detailed description which should be read in light of the accompanying drawings.

DETAILED DESCRIPTION OF THE PREFERRED EMBODIMENTS

Figure 1:
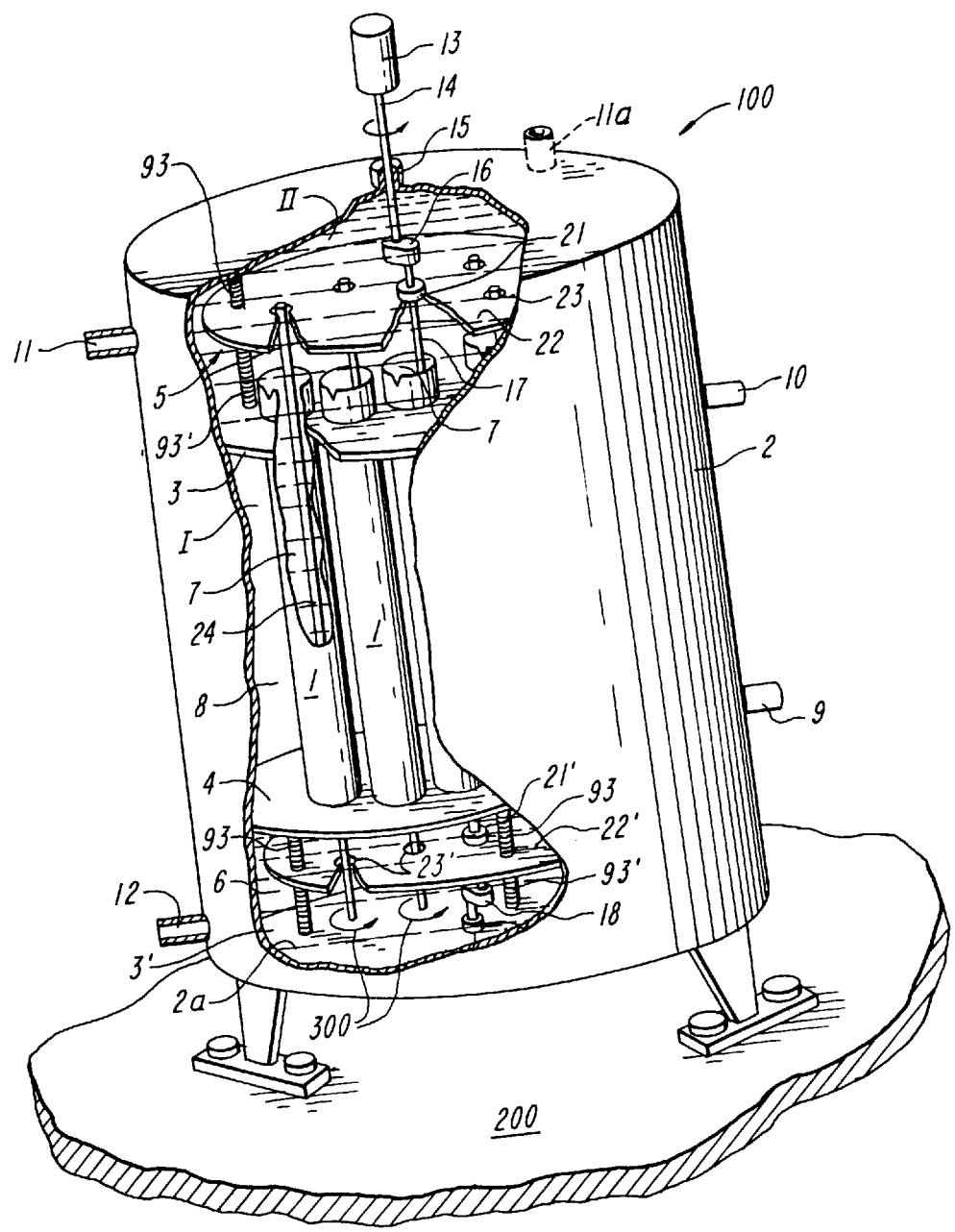
FIG. 1 is a view in perspective, with portions cut away, of an orbital drive, open-tube, whip rod heat exchanger according to the present invention operated in a flooded mode and in a non-vertical orientation.

FIG. 1 shows a heat transfer apparatus 100 according to the present invention that uses an orbital whip rod drive. A container or outer shell 2 encloses a number of heat transfer tubes 1. A top tube sheet 3 and a lower tube sheet 4 together with the tubes 1 divide the inside volume of container 1 into compartments 5, 6 and 8. Compartment 8 represents the outer or shell side of the heat transfer system. The inner or tube side includes both an upper chamber 5 and a lower chamber 6 as well as the space inside all of the tubes 1. Each tube 1 provides inner 7 and outer heat transfer surfaces. It is thin-walled and made of a material with high heat transfer properties such as copper or steel. The tube may have certain surface treatments such as grooving that may be used to enhance the heat transfer properties for either the inside or the outside surfaces of the tube.

A first process media I may be introduced into chamber 8 via a conduit or nozzles 9 and 10 to exchange heat through the wall of the heat transfer tubes 1 with a second process media II, which may be introduced into the upper chamber 5 via conduit 11 as well as conduit 12 at the lower chamber 6. For example, for desalinization, the media II is seawater and media I is a heated vapor such as steam. For making ice slurries, media II is water with an additive that promotes the formation of large ice crystals in the water rather than on the tube wall. Media I is preferably a pressurized refrigerant that boils at the outer surface to form a two phase vapor/foam stream. A suitable additive for water is ethylene glycol (automotive antifreeze), propylene glycol, milk, seawater, calcium magnesium acetate, and certain inorganic salts such as sodium bicarbonate that form anhydrous crystals. A 3 to 10% solution is typical. Successful additives result in the formation of very fine, powdery ice crystals. Additives that do not work form ice crystals as large, flat flakes. Appropriate solutions, when left in an ordinary home freezer overnight will be slushy, and stirrable; unsuitable additives and solution strengths will result in a frozen mass.

When the apparatus 100 is used in an evaporation process, the media I in the chamber 8 having a higher temperature will be used to evaporate a second media II inside chamber 5 having a lower temperature. In particular, steam may be introduced into chamber 8 via conduit 10 and upon condensing onto the outside surface of tubes 1 to form condensate which flows out from the outlet 9. The heat thus released will be used to evaporate the media II, a fluid introduced into the upper chamber of 5 via conduit 11 feeding to the top of the tube sheet 3. In one form of feed distribution, the feed will be distributed over tube sheet 3 in the form of a liquid pool 24. This liquid will then flow down into the tubes 1. The latent heat released by the condensation of the steam inside chamber 8 passes through the wall of tubes 1 to evaporate the liquid inside the tube. Vapor generated may flow either through the upper end of tubes 1 and exit from outlet 11a (in phantom), or in another arrangement to flow downward in tubes 1 co-current with the flow of the liquid stream to flow out from the outlet 12 at the lower end of chamber 6.

Inside each tube 1 there is a whip rod 24 which is driven to revolve in an orbital manner inside the tube. The orbital motion is represented by curved arrows 300. This orbital motion will generate a centrifugal force to cause the whip rod to bear upon the inside surface of the associated tube 1 with the rod aligned with the tube axis. In a falling film mode of operating shown in FIG. 2, this motion will spread liquid a stream into a thin and uniform liquid film to facilitate its evaporation and thereby to increase the heat transfer coefficient. In the flooded mode shown in FIG. 1, the rod motion creates turbulence in the feed liquid II and it can control the deposits of solids on the inner tube surface.

The mass, configuration, and speed of revolution of the rod will vary with the application, mode of operation, the condition and size of the tube and other factors in a manner that will be readily understood by those skilled in the art. For instance, for seawater desalination, one desirable feature would be to let the orbital motion of the rod minimize the scale forming tendency of the various ingredients dissolved in the seawater which may precipitate out to form scale while the water is evaporated. In the case of the concentration of some food products, the rod should be able to push the concentrated fluid against its viscosity while at the same time not damaging delicate material inside the concentrate. For making ice slurry the direction of the flow of the heat will be from the inside of the tube to its outside so that ice crystals form as the liquid is chilled and flows downwardly. For this application the function of the rod will be to disrupt and dislodge the incipient formation of ice crystals that may stick to and grow from the inside surface of the tubes 1.

In the configuration of FIG. 1, the rods 24 are preferably free-standing inside the tubes 1 with their lower ends resting upon a plate or the shell lower end wall 23 with some suitable low friction surface for the rods to slide upon to perform the orbital motion 300. In the preferred form for flooded mode operation, this orbital motion of the rods 24 is actuated by a pair of vertically spaced, horizontally extending drive plates 22,22'. These plates can be supported on flexible shafts 93 and 93' which are anchored at one end to the end covers of 2a, 2b, the shell 2 and at the other end to the plates 22 and 22'. These flexible shafts 93 and 93' are rigid in their torsional mode, but flexible in their bending mode. A universal joint would function in the same manner. Suspended in this manner, plates 22 and 22' will have freedom for translational motion, but not for torsional motion.

At the center of plates 22 and 22', there are bushings 21 and 21' through which a shaft 17 passes and is driven to revolve by cranks 16 and 18 attached to a center shaft 14, which in turn is driven by motor 13 through bearings and seals 15 mounted on the container 2. Thus when the motor 13 operates it produces an orbital motion of the plates 22, 22' which then drive all the rods 24 captured in holes 23 in a similar orbital motion. The radii of the cranks 16 and 16' are adjusted so that the orbital rods 24 will orbit freely inside tubes 1. The diameter of the holes 23 is considerably larger than the diameter of the rods 14 to allow each rod to make its own adjustment while it orbits inside the tube 1.

FIG. 1 shows the orbital rod heat exchanger 100 rigidly attached to a flat plate 200 which is angled away from the horizontal to simulate the deck of a ship being tilted in a heaving motion. The exchanger 100 is correspondingly angled into a non-vertical orientation. For such moving base operation, none of the traditional liquid level controls and feed liquid distribution methods associated with falling film modes of operation would be effective. On the other hand, feed distribution is totally unaffected by orientation when the tube side chamber 1, 5, 6 is completely flooded, and the feed liquid II may be introduced from either end of the tubes. The whip rods 24 are driven to orbit by two drive plates 22, 22', one at each end of the rods. This is a more positive drive technique than driving from only one end of the rods, but it is strongly preferred in moving base or non-vertical operation and for operation with a totally flooded tube side chamber.

Figure 2:
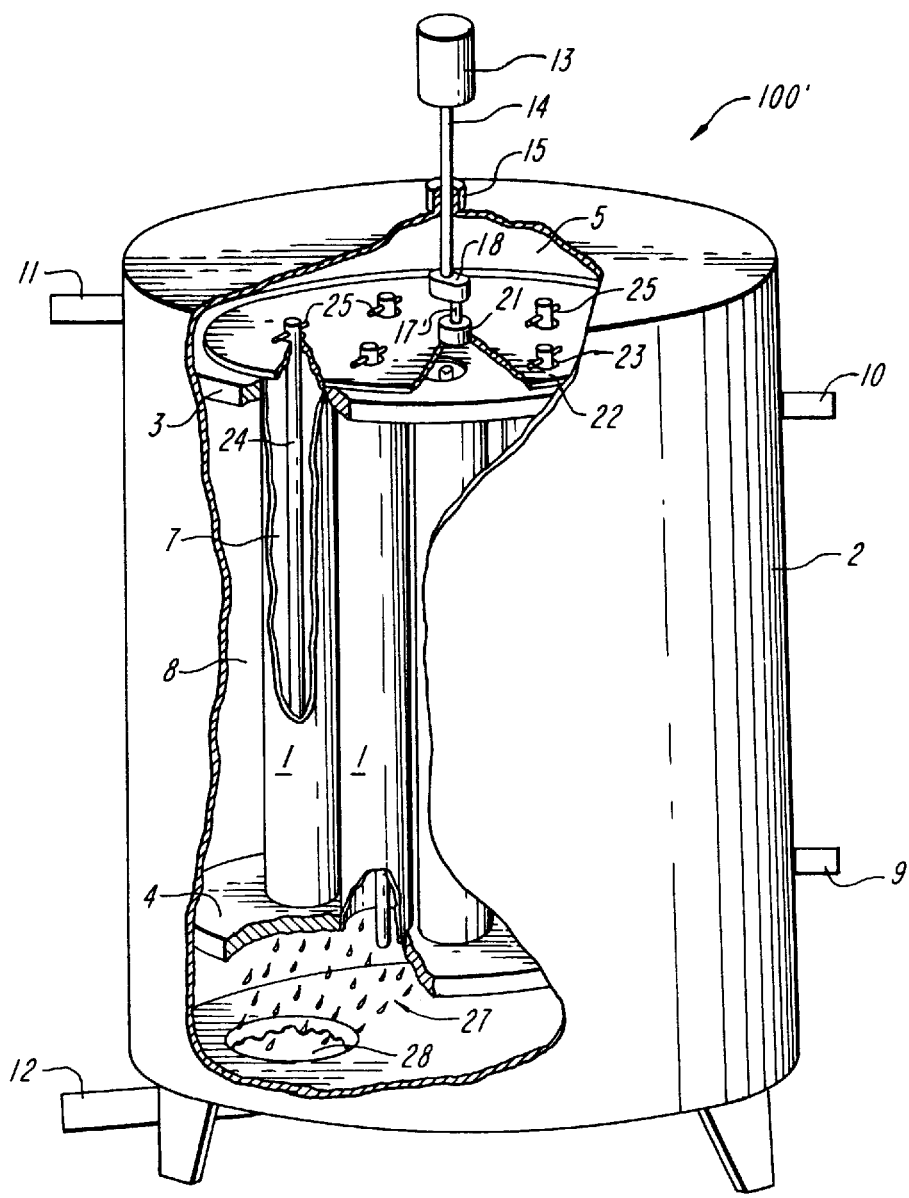
FIG. 2 is a view in perspective, with portions cut away, of another embodiment of an orbital drive, open tube, whip rod heat exchanger according to the present invention operating in a falling film mode and in a vertical orientation.

FIG. 2 shows the cut a way view of an orbital rod heat transfer device 100' (like parts in the Figures having the same number) using a single drive plate 22 mounted above the top tube sheet 3. The orientation of the exchanger 100' is generally vertical and the whip rods 24 are hung through the holes 23 by horizontal pins 25 secured to one end of each rod and sized so that they cannot fall through the holes 23 regardless of the position of the rod with respect to the hole. This mounting arrangement allows for simple "drop in" assembly, or disassembly for repair or maintenance. The orbital motion of the rods inside the heat transfer tubes 1 is again powered by the motor 13, transmitted via the shaft 14 through the bearing 15 to turn the crank 16 and crank pin 17', which introduces the orbital motion to bearing 21 at the center of plate 22. Plate 22 will follow the circular motion of crank 16 with true circular orbital motion, i.e. without rotation, because all whip rods are confined to move in circular motion as if the plate were guided by multiple cranks. The forgiving nature of this multiple drive situation against wear and manufacturing tolerances results from making holes 23 significantly larger than rods 24. By way of example but not of limitation, if the tubes are 1.50 inch in inside diameter and four feet (1.22 m) long, the rods are 3/8 inch (0.94 cm) stainless steel of somewhat longer length, and the holes 23 have a diameter of about 5/8 inch (1.59 cm). The clearance between rods 24 and holes 23 also serves as the inlet of the feed to each tube when the exchanger is operated in a falling film mode, as shown in FIG. 2. While the feed lubricates the hole 23-to-whip rod 24 coupling, the rods in turn keep the holes from clogging with debris such as ice particles.

With the rods hanging from their upper ends, there is no obstruction at their lower ends, thereby allowing the free flow of ice slurry 27 into the drain hole 28 and exit through conduit 12 to the intake of a suitable pump (not shown) that propels it to a storage tank or, at least in part, in a recirculation loop back to the exchanger 100'. Sometimes, it may be desirable to extend the rods beyond the lower tube sheet and closer to the bottom. By so doing, the added mass of the lower free end of the rod will increase the contact pressure of the rod against the lower inside surface of the tube, exactly where the concentration of ice slurry in the flow stream reaches its maximum and has the greatest tendency to freeze up. The extended ends reaching toward the bottom surface also help to stir up the ice slurry to enhance its flow into the drain hole 28.

When the exchanger 100' is operated as a freezer or chiller, liquid refrigerant is introduced into chamber 8 through inlet 9 and evaporated upon contact with the outside surface of heat transfer tubes 1. The vapor thus produced will exit from outlet 10 into a condensing unit (a standard commercial combination of compressor, condenser, receiver and suction accumulator), which returns the liquid refrigerant back to inlet 9.

The chilling effect associated with evaporating the refrigerant sucks the heat from the water flowing down the inside surface 7 of the tubes 1. The water then becomes a partially frozen ice slurry. The orbital motion of the whip rod 24 pushes the water to revolve around the inside surface of the tube in front of the rod and leaves a thin film behind the rod. The combination of the thin film, complete tube wetting, and turbulent wave front of the flow stream produce an improved heat transfer property inside the tube 1.

In this freezer application, it is desirable to enhance the crystallization of the ice inside the body of feed water. Ideally, crystal growth will occur in the turbulent flow stream produced by the rod movement rather than the tube wall. In tests with 5% calcium chloride solution, the fluid leaving a single tube test unit was initially supersaturated (subcooled several degrees C. below equilibrium freezing temperature). At one point, the solution turned white as a cloud of fine crystals spontaneously nucleated to relieve the supersaturation. Blowdown temperature quickly climbed to the equilibrium value and remained there for the duration of the test. This spontaneous nucleation phenomenon supports the hypothesis that crystal growth occurs in the bulk solution in front of the whip rod rather than on the tube wall. However, there is no clear or generally agreed-upon understanding of the mechanism by which the ice forms.

The rods typically revolve at about 400 to 700 rpm, or about 10 times a second. This is much faster than the ½ to 1 second necessary for water to free fall down the 4 foot (1.22 m) long tube. Therefore, the water actually flows along a long shallow spiral path, constantly being pushed by the rod 24. This reduces the opportunity for crystals to grow upon the wall.

Figure 3:
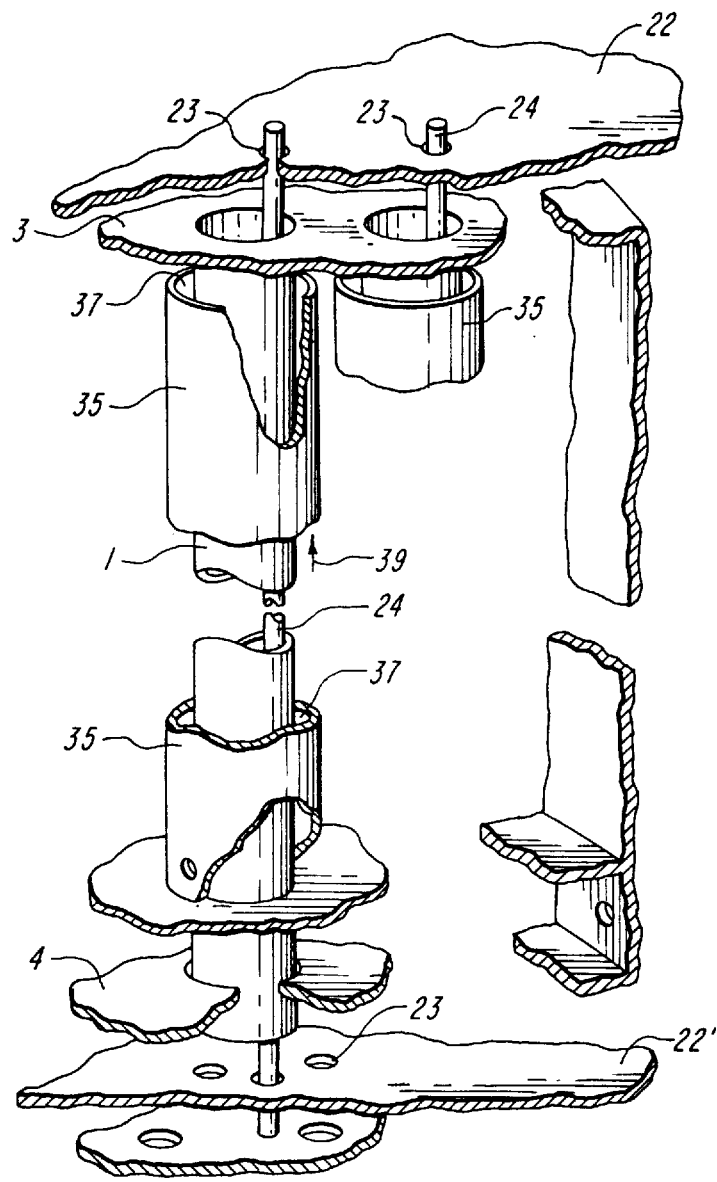
FIG. 3 is a detailed view in perspective, with portions broken away, of the positive rod orbital drive shown in FIG. 1 and also showing a thermal jacket to enhance the flow of a boiling refrigerant over the outer surface of each heat transfer tube.

On the refrigerant side, heat transfer performance can be enhanced by various means such as a grooved surface to increase the surface area exposed to the refrigerant. However, applicants have found that with a vertical tube heat exchanger it is advantageous to use a concentric, tubular jacket 35 open to a flow of the refrigerant at its top and bottom and to enhance the circulation of the refrigerant through percolation, as shown in FIG. 3. The jacket 35 restricts boiling of the refrigerant to the annular space 37 between the heat exchange tube 1 and jacket 35. It appears that a strong convection flow may be established with lighter, vapor bubbles driving a fluid stream rising rapidly along the heat transfer surface. The resulting high vapor velocities are believed to create shear forces that substantially improve the boiling side film coefficient and make the heat flux more uniform over the tube. While first thought beneficial only for orbital ice makers, the thermosyphon tube concept is now seen as having advantages for vertical tube heat exchangers with boiling on the shell side in general. With an external separator vessel (to separate the two phases) and double tube sheet construction, this thermosyphon construction and theory of operation could also be extended to horizontal tube heat exchangers.

With the jacket 35 used at the outside of the tube 1, a typical heat transfer coefficient of an orbital freezer is about 800 BTU/hr-ft$^2$-°F. for a system with 1.5 inch OD steel tube, and a 3/8 inch OD stainless steel whip rod, orbiting at 700 rpm. With an 8° F. temperature difference, the heat flux would be about 6000 BTU/hr-ft$^2$. R22 has been used as the refrigerant while 5% ethylene glycol or 3.5% salt were typical additives to the feed liquid.

Figure 4:
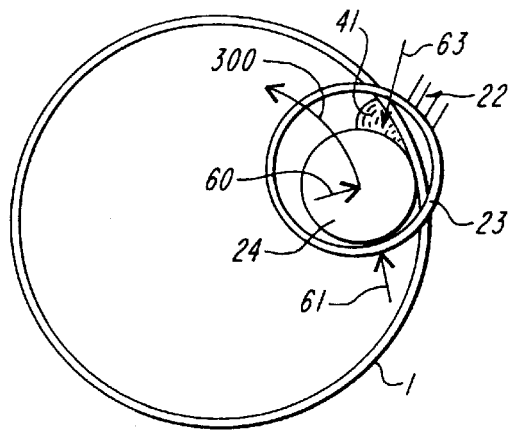
FIG. 4 is a simplified view in horizontal section of a heat transfer tube and orbiting whip rod illustrating the dynamic forces acting on the rod and the liquid in the tube when operated in a falling film mode.
Figure 4A:
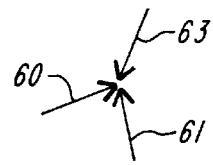
FIG. 4A is a force vector diagram showing the dynamic forces acting in FIG. 4.

FIG. 4 and FIG. 4A illustrate the dynamics of the physical interaction between the whip rod 24 the feed liquid, and the tube 1 as the rod 24 is pushed by the opening 23 of the orbital plate 22 into an orbital motion represented by the circular arrow 300 concentric with tube 1. A downwardly moving fluid stream 43 is pushed by whip rod 24 in front of its orbital motion. Force 60 is the centrifugal force of rod 24 driven to revolve inside tube 1 by force 61 derived from the movement of the openings 23 of plates 22 and 22' that drive the rod. This centrifugal force is reacted by the hydrodynamic force 63 acting upon the surface of rod 24 when the fluid is being pushed by the rod.

FIG. 4A is a force equilibrium diagram showing the physical nature of the balance of these force vectors more clearly. Essentially the tangential component of vector 63 is balanced by vector 61 which is directly related to the drive power supplied by the motor 13. The radial component of vector 63 is balanced by the centrifugal force which is a function of the speed, diameter and density of the rod. Since the speed and the diameter of the rod also affect the characteristic of vector 63, only the density of the rod is an independent control factor.

In a complete system the summation of the centrifugal force of all of the whip rods and that of the drive plates represents a revolving disturbing force acting upon the total system to give it a shaking motion.

It is also important to note that FIG. 4A is a hypothetical equilibrium diagram of the three force vectors 60, 61 and 63 acting in a plane perpendicular to the center line of the tube 1 at the middle of the length of the tube. This hypothesis is a good description of the forces acting on the moving rod 24 when the rod is driven by two drive plates acting at the two ends of the rod. In the case when the rod is driven from only one end, a moment occurs since the drive force 61 and the center of the reaction force 63 are no longer acting in the same plane.

The reaction to this tilting moment comes from the curvature of the tube and the rigidity of the rod. More specifically, the centrifugal force 60 urges the rigid rod to align itself flush the tube wall, in parallel with the tube center line, where the curvature is zero. Thus with the help of the centrifugal force 60, the rod tends to revolve in parallel with the center line of the tube as if being guided by a bearing. As noted above, in certain applications, such as the production of an ice slurry, ice can accumulate and/or grow more at the lower tube end (assuming a vertical orientation) than at the upper end. As the exchanger is operated with enhanced heat fluxes, this situation may overcome the rod aligning affect of the centrifugal force 60, and eventually can cause the apparatus to freeze up. Applicants' solution to this problem is described below with reference to FIG. 7.

The flow stream 41 is highly turbulent. In freezer applications it is where most of the crystallization of the ice is presently believed to occur. Some incipient formation may also occur on the surface of the tube in the thin film left behind the rod. The turbulence in the flow stream 41 and the mechanical action of rod 24, in combination with the action of the additive as described above, are believed to prevent these incipient ice formations from growing into a thickened hard ice patch or coating that is so firmly attached to the tube wall that it is impossible for the rod to remove it.

Figure 5:
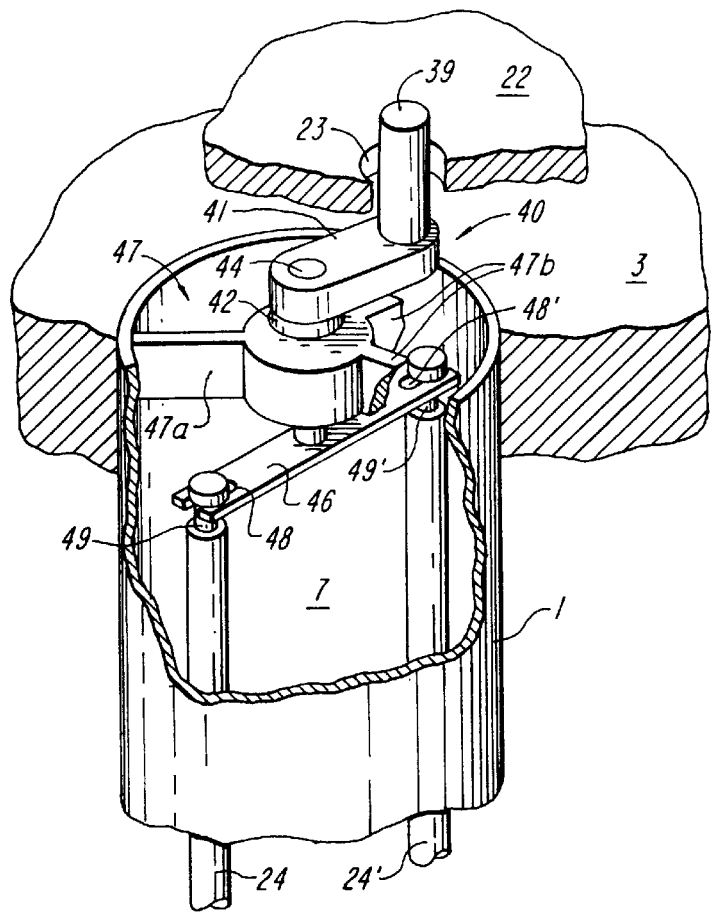
FIG. 5 is a detailed view in perspective of an orbital plate drive for a heat exchanger according to the present invention where an orbiting top drive plate is positively coupled to one of multiple pairs of freely rotatable, dynamically balanced whip rods.
Figure 7A:
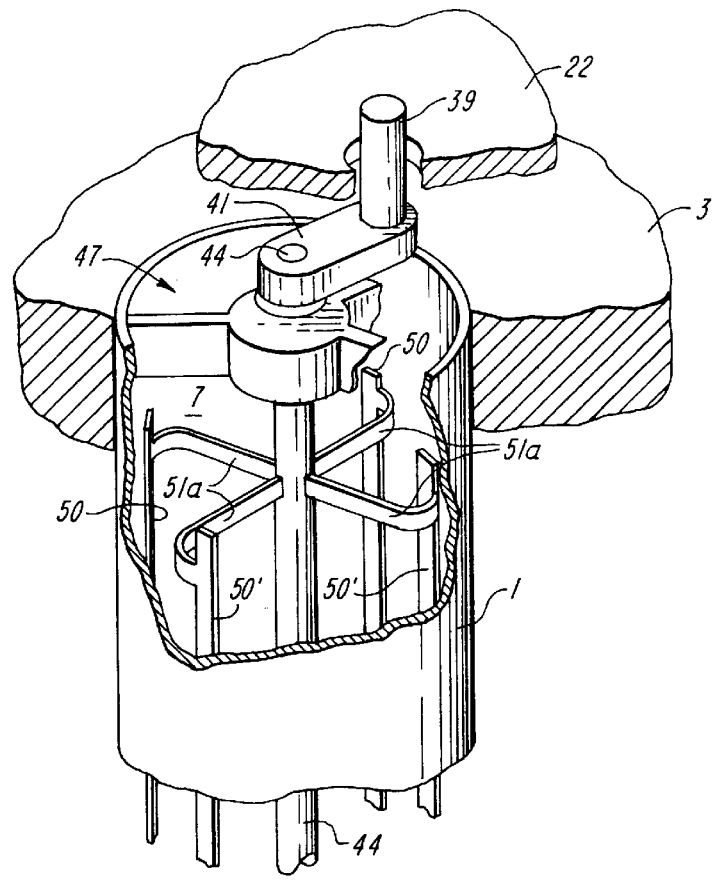
FIG. 7A is a detailed view in perspective of an alternate, four rod embodiment of the embodiment shown in FIG. 7.
Figure 7:
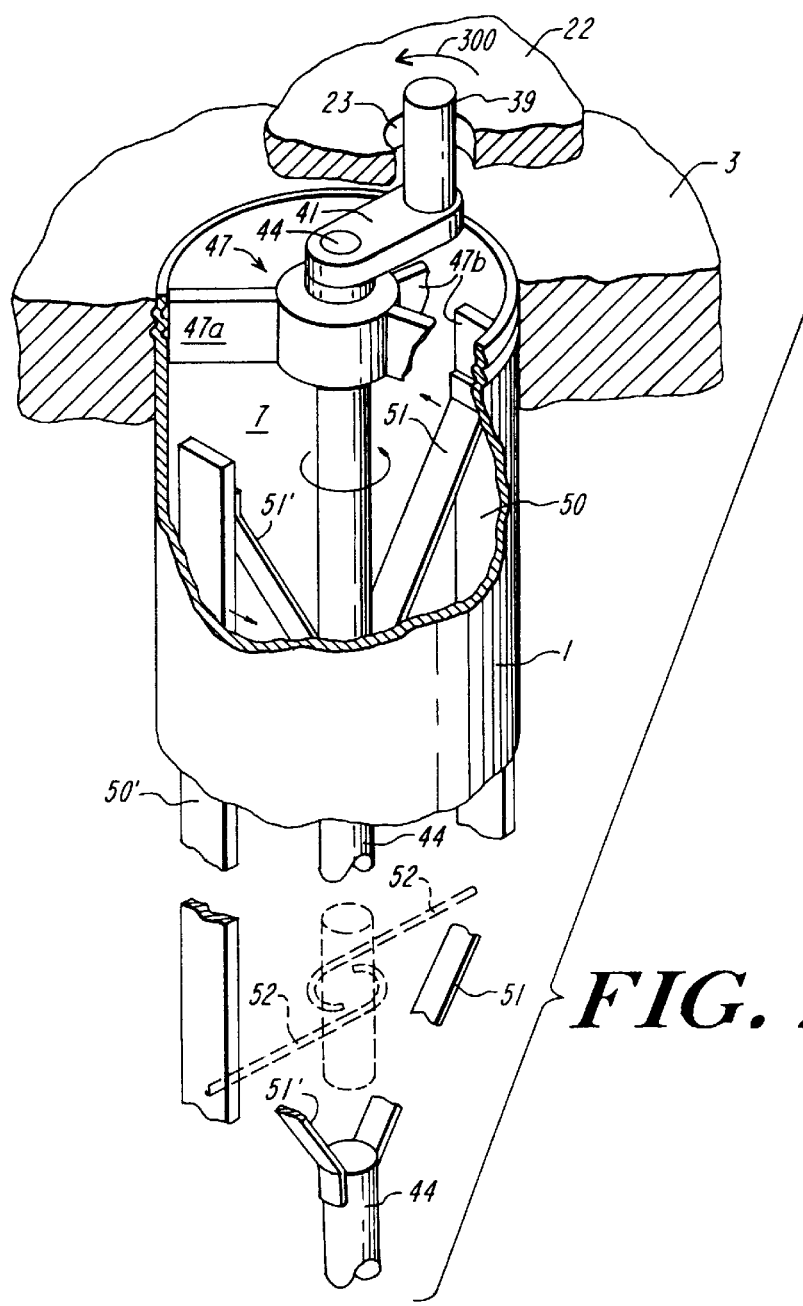
FIG. 7 is a detailed view in perspective corresponding to FIG. 5, but showing an alternating embodiment utilizing a pair of offset flat whip rods and auxiliary radial force spring mounts according to the present invention.

FIG. 5 shows another significant feature of this invention, an orbital drive formed by a single orbital plate 22 that drives multiple cranks 40, one associated with each heat transfer tube 1 (like parts in different embodiments again having the same reference number). One such tube is shown in detail in FIG. 5. A main rotatable shaft 44 of the crank is guided by a bushing 42, which is secured by three-legged, spider-like bracket 47 to keep the center line of shaft 44 concentric with tube 1. The bracket is designed with one rigid arm 47a and two deflectable arms 47b so that the assembly can be snapped into the tube and be self-centering. Detents shown in FIG. 7 are provided in the tube periphery to engage bracket arms positively with a snap-in engagement. These detents are formed during the usual hydroswaging process to bond the tubes 1 to tube sheet 3. Note that the bracket 47 and crank 40 can be top-loaded into the tube 1 for ease of assembly and disassembly for maintenance.

The upper end of crank shaft 44 is secured to a crank arm 41, which in turn carries a crank pin 39 which is captured in, and thereby mechanically coupled to the drive plate 22. Each pin 39 is captured in an opening 23 in the plate which, as described above, is preferably oversized with respect to the pin diameter. The lower end of the shaft 44 engages a revolving member 46, shown here as a flat arm with two slots 48 and 48' at its two ends. These two slots fit loosely over recessed necks portions 49 and 49' formed in the rods 24 and 24' at their upper ends to support them. At the same time this mounting arrangement allows the rods to roll inside the tube 1 as the crank assembly is driven to revolve by an orbital motion of the orbital plate 22 in a plane generally orthogonal to the rods 24, 24' and to the axis of the tubes 1. Note that this embodiment is best suited for single top plate drive with a vertical orientation, but can be used in dual plate drive, as in non-vertical orientations. It is also significant that the mounting of the rods is not rigid. They can move freely in a radial direction within the slots 48, 48' which provides the advantages of a stiff but flexible whip rod and avoids the precision, tolerancing and wear problems that characterize traditional rigid wipers.

Figure 6:
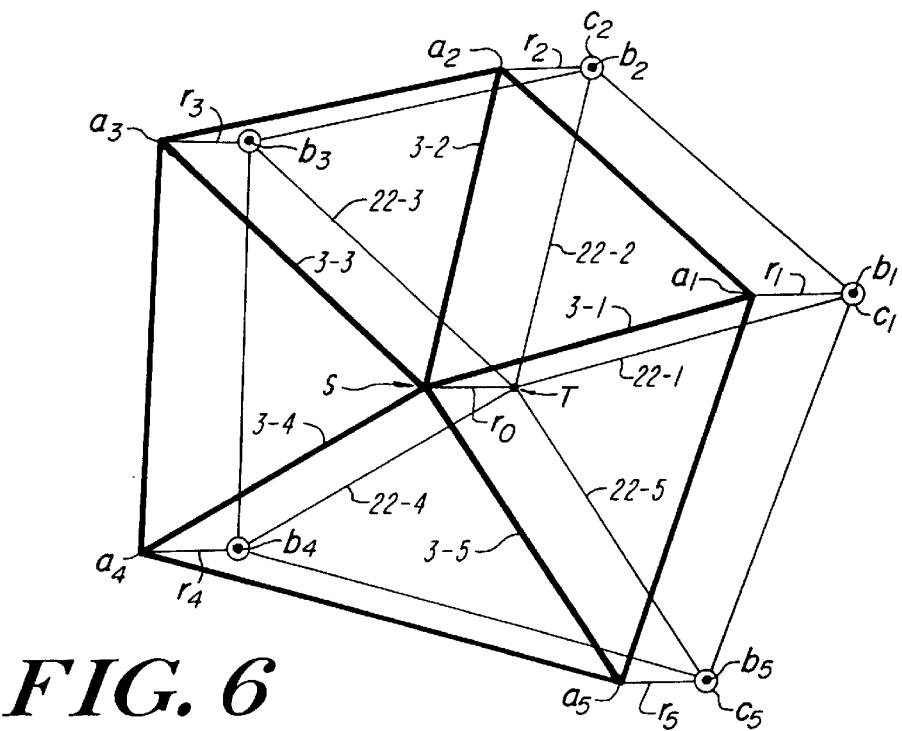
FIG. 6 is a diagrammatic top plan view showing the wear and tolerance insensitivity of the orbital drive of FIGS. 5 and 7 exemplified by five tube centers $a_1 \ldots a_5$ and five associated drive plate coupling points $b_1 \ldots b_5$.

FIG. 6 illustrates how the orbital drive of FIGS. 2, 5 or 7 accommodates wear and manufacturing tolerances with reference, for the sake of simplicity of presentation, to a five tube heat exchanger with the tubes arrayed in a single circle, equiangularly spaced about a center S of tube sheet 3 of FIGS. 2, 5 or 7. The star shaped pattern $a_1$–$a_2$–$a_3$–$a_4$–$a_5$ represents the tube pattern on tube sheet 3 with the points corresponding to the center lines of tube 1, as well as the center lines of crank shafts 44 in FIG. 5 and FIG. 7 embodiments. S represents the center line of the main drive crank shaft 15. In principle S should be located at the geometric center of the tube pattern $a_1$–$a_n$, as shown. The heavy lines 3-1, 3-2, 3-3, 3-4 and 3-5 between points a represent the connecting web of the tube sheet 3, or any equivalent structural member or members.

Points $b_1$–$b_2$–$b_3$–$b_4$–$b_5$ in FIG. 6 and the light lines 22-1 . . . 22-5 joining them represent the orbital drive plate 22 with its geometric center located at T. In principle, patterns a and b should be identical so that when the orbital drive plate pattern b is displaced translationally from the tube sheet pattern a, all displacement vectors r are identical. In particular, when r is fixed by the radius of the crank arms, pattern b will move in a true circular orbital motion.

The dimensional tolerance problem may be examined at each of the parallelograms $b_i$–T–S–$a_i$–$b_i$ to check the accumulated dimensional error around the loop. The dimensional error results from a combination of wear, bearing play, manufacturing tolerance in the tube pattern, and off-center tolerance in the bracket 47. In the orbital drive plate design, all the accumulated error around the loop $b_i$–T–S–$a_i$–$b_i$ can be easily accommodated by a typical ¹⁄₁₆ inch gap between the drive hole 23 and the crank pin 39. This gap is represented by the circles $C_i$ surrounding the points $b_i$.

When the orbital plate drive of this invention is used to drive a crank (whether an orbital rod or a full-fledged, conventional style of FIG. 5) with a radius r of ½ inch, this ¹⁄₁₆ inch tolerance results in a 5° phase shift of the crank angle in that tube with respect to the main drive crank 16. This in turn translates into a very small shift in the loading pattern of the crank reaction forces upon the drive plate. Operating experience has demonstrated, however, that the orbital drive plate arrangement is very forgiving to wide variations in the size and shape of the drive holes 23. In short, not only does this orbital drive efficiently transmit an orbital motion on simultaneously to multiple tubes, it does so in a way that is substantially insensitive to wear anywhere along the drive and has no parts that require manufacture or assembly to strict dimensional tolerances. The drive is durable, easily maintain, and has a comparatively low cost of manufacture. It also requires few parts. For example, there is no complex gear train to transmit rotary power to the multiple tubes, nor for most applications, is a lower drive plate necessary.

FIG. 7 shows the use of the crank assembly to drive a pair of diametrically opposed, flat whip rods 50 and 50' with a generally rectangular cross section that 1) enhances turbulence in the feed liquid in the tube as it moves and 2) has a leading, chisel-like edge adjacent the inner tube wall 7 to remove solid deposits (e.g. ice crystals when used as a freezer), that accumulate on or grow from the tube wall.

Another principal feature of this invention is an arrangement for providing an auxiliary, radially-directed force on the rods 50, 50' to supplement the centrifugal force 60. A presently preferred implementation is a pair of springs 51 and 51'. The engaging force of the whip rods against the tube surface 7 is then a combination of the centrifugal force, the gravitational component of spring 51, and the elastic force of the springs 51, 51'. Note that this produces a non-rigid mounting for the rods 50, 50', as do the slots 48, 48 in the FIG. 5 embodiment. This "loose" radial positioning helps to achieve the objects of this invention without precise mechanizing, tolerancy and assembly.

In use in a freezer/chiller, a simple spring-loaded whip rod as shown in FIG. 7, operating at a low speed but with a high torque, can allow ice to form as a thin coating on the inner tube surface 7 to a degree that would be unacceptable when the only radially directed component of force was centrifugal, whether the rod or rods were driven passively or positively. As the ice coating grows to an unacceptable thickness, it is simply scraped off by the brute force of this drive. The resulting crystal shape of the ice shaved from the wall may be preferred for certain applications. Note also that low speeds, e.g. less than 100 rpm, ordinarily develop an insufficient centrifugal force to maintain the alignment of the rods and to control solid deposits on the wall. The spring mount makes lower speed operation possible, with reduced vibration and other related problems.

When making an ice slurry for thermal storage, it is desirable to encourage the crystallization to occur in the turbulent downward flow stream 41 ahead of the whip rod, rather than on the tube surface 7. Once the ice attaches to the surface, it is more difficult to scrape off. This layer of ice encourages further growth on the wall. The danger is that a thick layer of ice will grow which can lead to an upset condition where the rods are frozen to the tube. A long meltdown time may be needed to recover from such an upset. In this situation, more careful attention must be paid to the operating conditions to be sure that the additive and whip rod can control the ice growth on the walls.

To facilitate operation as a freezer, particularly in the ice-slurry mode, hooks 52 and 52', shown in phantom in FIG. 7, are secured at one end to the whip rods 50 and 50', and hooked at the other end over the center shaft 44. The hooks act as rigid stops that set the maximum travel of the rods 51,51' away from the shaft 44 in response to the elastic force of the springs and the centrifugal force 60. The hooks maintain a narrow well-defined gap between the whip rods 50 and 50' and the inner surface 7 of tube 1 typically a few mils (0.004 inch, 0.010 mm).

It is significant to note that the use of two rods in each tube that are spaced angularly by 180° from one another produces a good self balancing of the rods as they move over the tube surface 7. Of course, more than two rods may be used. Four rods spaced angularly by 90°, as shown in FIG. 7A, offers the same balance benefits with increased rod action at a given orbital speed.

Figure 5A:
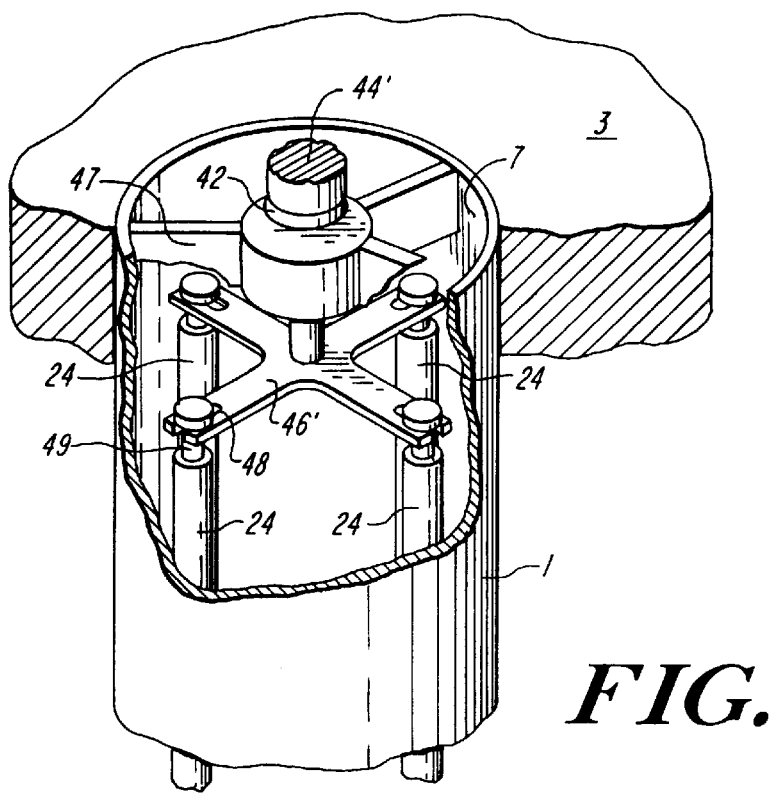
FIG. 5A is an alternate embodiment corresponding to FIG. 5, but using four whip rods.

For a small system several loosely swinging whip rods in one cylinder shown in FIG. 5A may be more economical than the use of several tubes each with only one rod and driven by a multiple drive mechanism such as an orbital drive or a gear train. In the experimental stage for testing the property of the whip rods, one tube in a concentric heat transfer jacket with whip rods driven in the same manner as FIG. 5A has been found to be exceedingly convenient and economical.

Figure 5B:
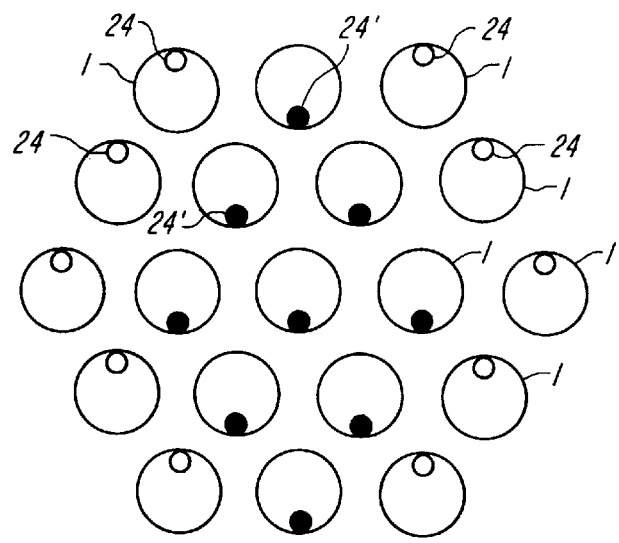
FIG. 5B is a schematic top plan view sharing a balance arrangement where groups of single rods are driven 180° out of phase with one another.

Using a crank to drive pairs of whip rods in each tube to maintain the dynamic balance as discussed before is easy to see if only one rod is used in each tube, the dynamic balancing may be accomplished by pairing groups of rods with diametric opposite phase angles as shown in FIG. 5B. In FIG. 5B the 19 rods in 19 tubes is divided into two groups of one group of 10 rods as represented by small circles 24 and another group of 9 rods as represented by the small dots 24'. In general, dynamic balancing must be considered in both the translational mode and the torsional mode. The target is to have the combined C.G of the opposing groups of rods to revolve around a common axis (preferably to be at the center line of the overall system) at 180° phase angle with respect to each other and with a nearly equal number of rods in each group.

The typical heat flux of 6000 BTU/ft$^{2-}$ hr cited earlier represents a practical upper limit for the orbital rod configuration of FIG. 2 with the exemplary operating conditions as given above. This orbital rod configuration has been found to have only a modest ability to remove incipient ice formation and avoid an upset when the heat exchanger is operated at commercially desirable levels, near 6000 BTU/ft$^2$-hr flux value. This is because the engaging force of the rolling whip rod depends only upon the centrifugal force 60, which is limited in magnitude under the best circumstances, and becomes smaller with the shrinking orbit radius as ice builds up inside the tubes 1. In this situation it is valuable to have an alarm to stop the operation as soon as incipient upset is detected to cut down the necessary recovery time.

By comparison with the configuration of FIG. 7, in the event that incipient ice formation (believed to be dendritic crystal growth) does occur on the surface 7, the spring controlled gap provides a gentle scraping effect to prevent its further growth, beyond the gap. This is important to avoid an upset. For this purpose, a spring controlled gap offers more flexibility than a rigidly mounted rod.

In brief summary, driving the whip rod "directly" with the orbital plate, as opposed to orbiting the entire heat exchanger or the tubes, greatly reduces the mass being driven and reduces the strain and design requirements on the drive mechanism. Driving "directly" is limited, however, to supplying the tangential force needed to push the rod forward; the whip rod loading against the tube results indirectly from the centrifugal force, which is a relatively small magnitude force and can not fully utilize the torque capability of the orbital drive. By driving the whip rod with an orbital plate via cranks, particularly with the additional option of loading the whip rods with springs, the orbital heat exchanger can fully develop the capability of the orbital drive heat transfer device for processing fluids with higher viscosity, particularly the manufacture of ice slurries.

Figure 8:
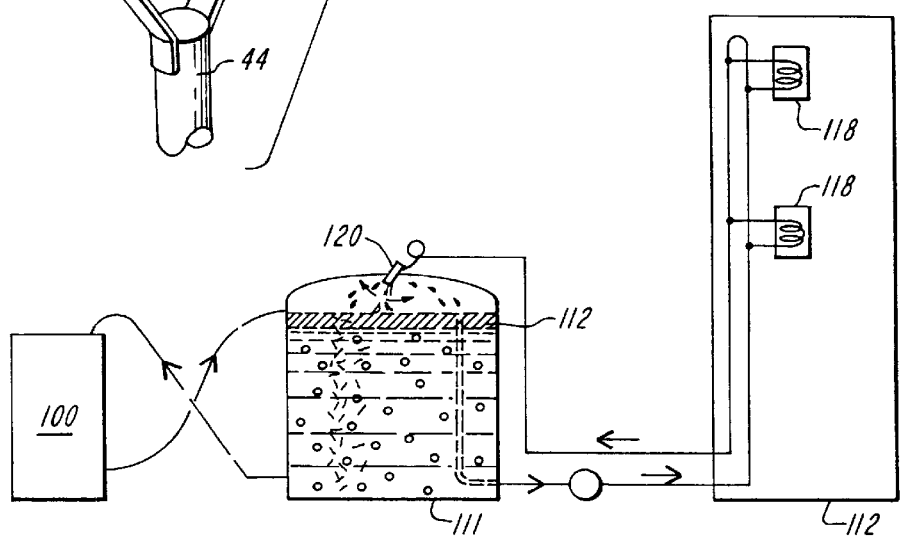
FIG. 8 is a highly simplified schematic view of a thermal storage system using a heat exchanger according to the present invitation and an ice burner according to the present invention.

FIG. 8 shows a complete heat exchanger system, in this instance, a thermal storage system 130 includes an ice slurry machine 100 constructed and operated according to the present invention, an ice slurry storage tank 111, and a building 112 or other installation where the "cold" stored in the tank 111 is supplied via a distribution system 118 (shown schematically as a coil) by melting the ice. The distribution system is a closed loop. It is significant that if the machine 100 is operated in a flooded mode, the system can supply cold to a high-rise building using only the normal circulation or supply pump for the system and no level controls.

If chilled water is distributed, the stored ice must be melted or "burned". Depending on the placement of the machine 100, gravity and convection can drive or assist the circulation. If the ice slurry is transported and distributed, it must be pumped from the tank to the distribution system. In such cold storage systems, the time periods for making and burning the ice are staggered, and usually have differing durations. In some applications (such as churches), the ice slurry can be produced and stored in the tank over an extended period, but burned in a relatively short period.

One special problem of ice storage is that the ice in the stored ice slurry stored in tank 111 tends to coagulate into an ice mass that floats on the water. Once used, warm return water is pumped back into the tank to burn the ice. The warm water tends to channel through the floating ice mass 112. This reduces the maximum possible burn rate and it permits the warm water to "short circuit" to the bottom of the tank while the tank still retains much of its ice charge. To deal with this problem, a movable nozzle 120 mounted on top of the storage tank moves about in a pattern to direct the recirculated warm water over the ice mass generally uniformly.

There has been described a novel orbital drive heat exchanger and thermal stage system that provide a highly efficient, effective heat transfer capable of operating in flooded or falling film modes, in vertical or non-vertical orientations, on a fixed or moving reference body. There has also been described a positive, mechanical, orbital drive for simultaneous operation of multiple heat exchangers of the whip rod-in-tube type with a high applied torque at each tube, and an option auxiliary radial force and rod-to-tube gap control. This drive is highly reliable and durable; it is substantially insensitive to normal wear and tolerance of parts and assembly. It also provides automatic self-adjustment for the rods, even when operating with a single end drive and with non-uniform resistance along the tube to movement of the rods. The drive is also characterized by a comparatively low cost derived from a low part count, low tolerance requirement, ease of assembly, and ease of disassembly for repair or routine maintenance. There has also been described a thermal jacket that produces an enhanced heat transfer at the outer surface of the heat transfer tube. The heat exchanger and system operate with high energy efficiency, are compact, scalable, and can operate in closed loop systems without special pumps or liquid level controls, particularly cold distribution systems in high-rise buildings.

While the invention has been described with respect to its preferred embodiments, it will be understood that various modifications and alterations will occur to those skilled in the art from the foregoing detailed description and the accompanying drawings. For example, while the whip rods and crank pins have been described as loosely held in openings in a drive plate, they could be mounted in bearings, albeit at an increased cost and a reduction in fluid feed options. Also, while the whip rods have been described as hung from the upper drive plate by pins, they could be hung by more elaborate means for free-standing on their lower ends, anchored flexibly at both ends, or supported by a pivot arrangement that enhances contact force at the lower end. These alternatives are believed, however, to be less desirable since they reduce operational options, have an increased cost, or are more susceptible to solids accumulation, particularly when used to make ice slurries. The drive plates can assume a variety of forms consistent with the general design objectives and structures described herein, as can the source of motive power and its coupling to the drive plate. For example, the drive plate can be formed from a rigid, closed loop frame that supports an array of rings using a network of wires or arms that extend across the frames. Each ring can capture an end of a rod or a crank pin, Also, while the motive force has been described as supplied by a motor via a main drive shaft and an eccentric, the drive can use multiple power sources with an arrangement to synchronize their operation, a rotary counterweight coupled to the drive plate that is suspended to move, without twisting, in one plane, or the mutually perpendicular linear drives mentioned above whose operation is coordinated to yield an orbital motion of the drive plate. These and other modification and variations are intended to fall within the scope of the appended claims.

We claim:

1. A heat exchanger having at least one heat transfer tube that exchanges heat radially through the tube wall between hot and cold fluids, one of which is a process fluid that flows through the tube at least along the inner surface of the tube, and a whip-rod disposed in said tube, comprising, drive means for positively moving said whip rod around the inside wall of said tube that includes a motive power source, mechanical means coupling said power source to said rod and for translating the output of said motive power source into an orbiting movement of said rod over said inner surface, whereby said moving whip-rod interacts with said process fluid physically and controls the deposit of solids from said first process fluid on said inner tube surface, said coupling and translating being substantially insensitive to the orientation of said tube and to the degree of filling of said tube by said process fluid.

2. The heat exchanger of claim 1 wherein said process fluid completely fills the inside of the tube.

3. The heat exchanger of claim 1 wherein said heat exchanger is mounted on a reference member that is movable.

4. The heat exchanger of claim 2 wherein said tube and said whiprod are in a non-vertical orientation.

5. The heat exchanger of claim 1 wherein said mechanical coupling means comprises at least one drive plate that extends generally orthogonally to said whip-rod.

6. The heat exchanger of claim 5 wherein said mechanical coupling means includes a crank operatively coupled between said drive plate and said whip-rod.

7. The heat exchanger of claim 6 wherein said heat transfer tube is substantially vertical, and said mechanical coupling means includes means for suspending said whip rod that allows at least a free radial movement of said whip rod with respect to said tube.

8. The heat exchanger of claim 6 wherein there are a plurality of said tubes and said whip-rods in a parallel spaced array and said mechanical coupling means includes a like plurality of cranks each disposed to be operatively coupled between said drive plate and at least one of said whip-rods.

9. The heat exchanger of claims 6, 7, or 8 wherein said whip-rod comprises at least two whip-rods disposed in each of said tubes and arrayed equiangularly within said tube to provide a dynamic balance during said moving and said mechanical coupling means includes means for moving said at least two whip-rods in unison and with a substantially constant angular relationship.

10. The heat exchanger of claim 9 further comprising means for developing an auxiliary radial force along said whip rods.

11. The heat exchanger of claim 10 wherein said auxiliary force means comprises spring means connected between each of said cranks and the associated ones of said whip rods.

12. The heat exchanger of claim 8 wherein the cold fluid is a refrigerant flowed over the outside of said heat transfer tube to produce a slush driven in said first process fluid and further comprising an additive to the first process fluid which favors the formation of slush in said process fluid, as opposed to on said inner surface when said radial heat transfer is sufficient to freeze the first process fluid.

13. The heat exchanger of claim 10 wherein said refrigerant boils, and further comprising a jacket surrounding said tube to define an annular flow passage for said refrigerant over the outside of said tube.

* * * * *